(12) United States Patent
Lindholm et al.

(10) Patent No.: US 9,304,775 B1
(45) Date of Patent: Apr. 5, 2016

(54) DISPATCHING OF INSTRUCTIONS FOR EXECUTION BY HETEROGENEOUS PROCESSING ENGINES

(75) Inventors: John Erik Lindholm, Saratoga, CA (US); Jered Wierzbicki, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1506 days.

(21) Appl. No.: 11/935,266

(22) Filed: Nov. 5, 2007

(51) Int. Cl.
*G06F 9/38* (2006.01)

(52) U.S. Cl.
CPC ............ *G06F 9/3836* (2013.01); *G06F 9/3851* (2013.01)

(58) Field of Classification Search
USPC .................................................... 712/22, 215
See application file for complete search history.

(56) References Cited

U.S. PATENT DOCUMENTS

| | | | |
|---|---|---|---|
| 5,430,851 A * | 7/1995 | Hirata et al. ................. | 712/212 |
| 5,471,597 A | 11/1995 | Byers et al. | |
| 5,537,542 A * | 7/1996 | Eilert et al. ................. | 709/201 |
| 5,627,982 A * | 5/1997 | Hirata et al. ................. | 712/206 |
| 5,669,011 A | 9/1997 | Alpert et al. | |
| 6,219,780 B1 | 4/2001 | Lipasti | |
| 6,237,083 B1 | 5/2001 | Favor | |
| 6,338,133 B1 | 1/2002 | Schroter | |
| 6,928,533 B1 | 8/2005 | Eisen et al. | |
| 7,401,204 B1 * | 7/2008 | Miyake et al. ................. | 712/22 |
| 2004/0111589 A1 * | 6/2004 | Lines et al. .................... | 712/215 |
| 2004/0172521 A1 | 9/2004 | Hooker et al. | |
| 2004/0193854 A1 | 9/2004 | Cho | |
| 2004/0250045 A1 | 12/2004 | Dowling | |
| 2004/0268335 A1 | 12/2004 | Martin et al. | |
| 2005/0223195 A1 | 10/2005 | Kawaguchi | |
| 2006/0218380 A1 | 9/2006 | Boggs et al. | |
| 2006/0224862 A1 * | 10/2006 | Ahmed et al. ................ | 712/214 |
| 2007/0067606 A1 | 3/2007 | Lin et al. | |
| 2007/0083735 A1 * | 4/2007 | Glew ............................ | 712/214 |
| 2007/0294510 A1 * | 12/2007 | Stuttard et al. .................. | 712/22 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.
Office Action in U.S. Appl. No. 11/831,873, mailed Jun. 7, 2011.

* cited by examiner

*Primary Examiner* — William B Partridge
(74) *Attorney, Agent, or Firm* — Artegis Law Group, LLP

(57) ABSTRACT

An embodiment of a computing system is configured to process data using a multithreaded SIMD architecture that includes heterogeneous processing engines to execute a program. The program is constructed of various program instructions. A first type of the program instructions can only be executed by a first type of processing engine and a second type of program instructions can only be executed by a second type of processing engine. A third type of program instructions can be executed by the first and the second type of processing engines. An instruction dispatcher is configured to identify and remove program instruction execution conflicts for the heterogeneous processing engines to improve instruction execution throughput.

17 Claims, 7 Drawing Sheets

DISPATCHING OF INSTRUCTIONS FOR EXECUTION BY HETEROGENEOUS PROCESSING ENGINES

BACKGROUND OF THE INVENTION

1. Field of the Invention

The present invention generally relates to processing data using heterogeneous processing engines and more specifically to a system and method for dispatching instructions for execution by heterogeneous processing engines.

2. Description of the Related Art

Current computing systems configured to execute programs include either fixed function computation units configured to execute a particular program instruction or set of program instructions or homogeneous processing engines configured to execute any valid program instruction. More recently, computing systems include heterogeneous processing engines, where different types of processing engines may each execute a subset of the different program instructions. In order to maximize processing throughput, it is desirable to distributing program instructions to the different processing engines so that each of the different types of processing engines are fully utilized.

Accordingly, what is needed in the art is systems and methods for improving program instruction execution throughput for computing systems that include heterogeneous processing engines.

SUMMARY OF THE INVENTION

An embodiment of a computing system is configured to process data using a multithreaded single instruction, multiple data (SIMD) architecture that includes heterogeneous processing engines to execute a program. The program is constructed of various program instructions. A first type of the program instructions can only be executed by a first type of processing engine and a second type of program instructions can only be executed by a second type of processing engine. A third type of program instructions can be executed by the first and the second type of processing engines. An instruction dispatcher may be configured to dynamically dispatch program instructions based on the type of processing engine that can execute each program instruction, in order to balance the workload between the heterogeneous processing engines.

Various embodiments of a method of the invention for dispatching instructions for execution in a SIMD (single-instruction multiple-data) architecture with heterogeneous processing engines include loading program instruction dispatch slots from dispatch queues and selecting instructions from the dispatch slots for parallel execution by heterogeneous processing engines. First dispatch slots are loaded with first program instructions that are highest priority program instructions from the dispatch queues. Second dispatch slots are loaded with second program instructions that are highest priority non-conflicting program instructions from the dispatch queues. The non-conflicting program instruction is a multi issue program instruction or is a program instruction that can be executed by a different type of the heterogeneous processing engines that can execute the program instruction in the first dispatch slot. When an execution conflict exists between the first program instructions a conflicting first program instruction is swapped with one of the second program instructions in order to output instructions for parallel execution.

Various embodiments of the invention include a system for dispatching program instructions for execution in a SIMD (single-instruction multiple-data) architecture that includes heterogeneous processing engines. The system includes a first dispatch queue, a second dispatch queue, and an instruction selection unit. The first dispatch queue is configured to store program instructions of a first type, program instructions of a second type, and program instructions of a third type. The program instructions of the first type can be executed by a first type of the heterogeneous processing engines. The program instructions of the second type can be executed only by a second type of the heterogeneous processing engines. The program instructions of the third type can be executed by the first type of the heterogeneous processing engines and the second type of the heterogeneous processing engines. The second dispatch queue is configured to store program instructions of the first type, program instructions of the second type, and program instructions of the third type. The instruction selection unit is coupled to the first dispatch queue and the second dispatch queue and configured to select highest priority program instructions from the dispatch queues as first program instructions that are loaded into first dispatch slots and highest priority non-conflicting program instructions from the dispatch queues as second program instructions that are loaded into second dispatch slots.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
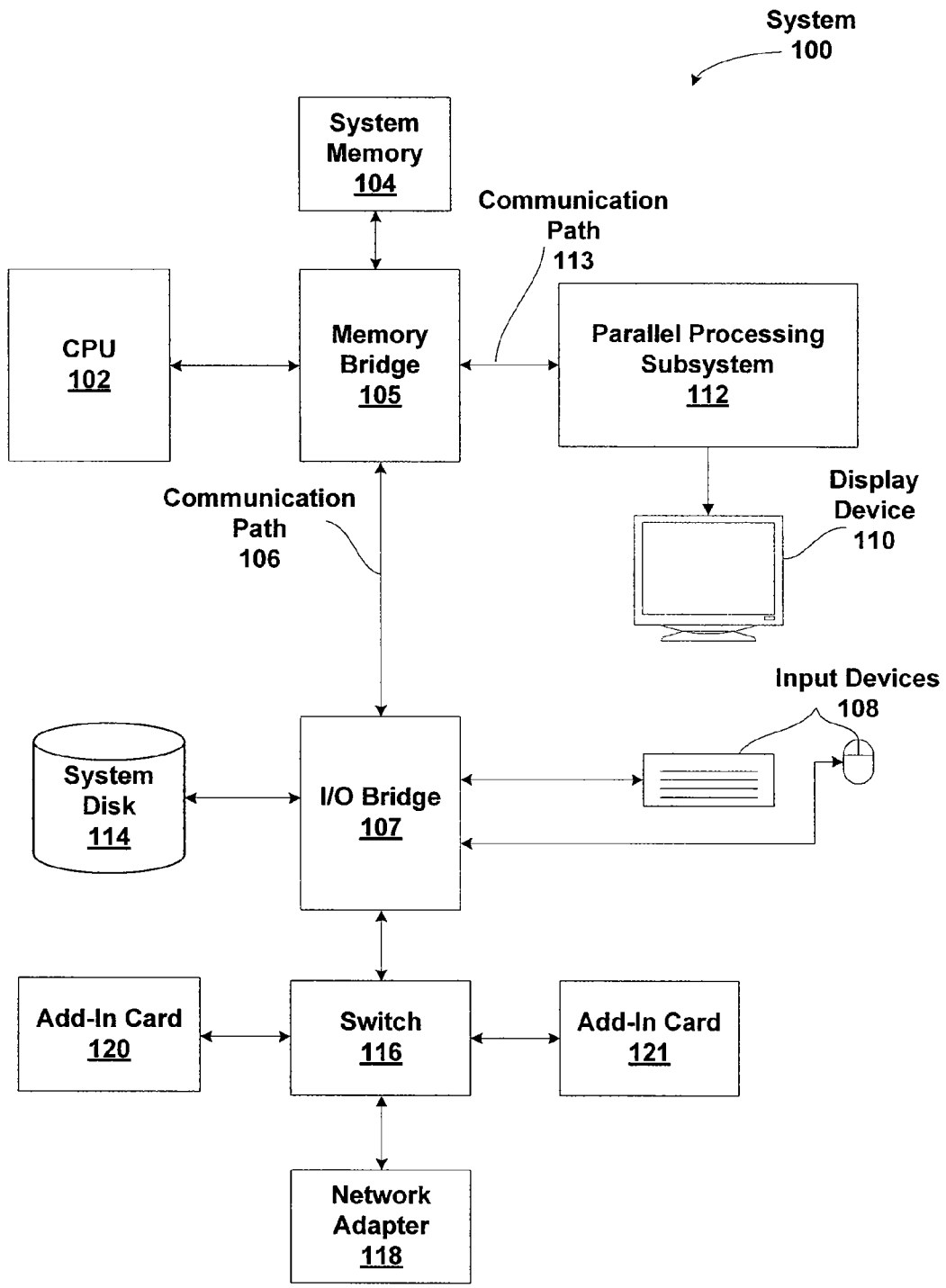
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport™ link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) Express, Accelerated Graphics Port, or HyperTransport™ link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disk (CD) drives, digital versatile disk (DVD) drives, film recording devices, and the like, may also be connected to I/O bridge 107. Communication paths interconnecting the various components in FIG. 1 may be implemented using any suitable protocols, such as PCI, PCI Express (PCI-E), accelerated graphics port (AGP), HyperTransport™, or any other bus or point-to-point communication protocol(s), and connections between different devices may use different protocols as is known in the art.

Figure 2:
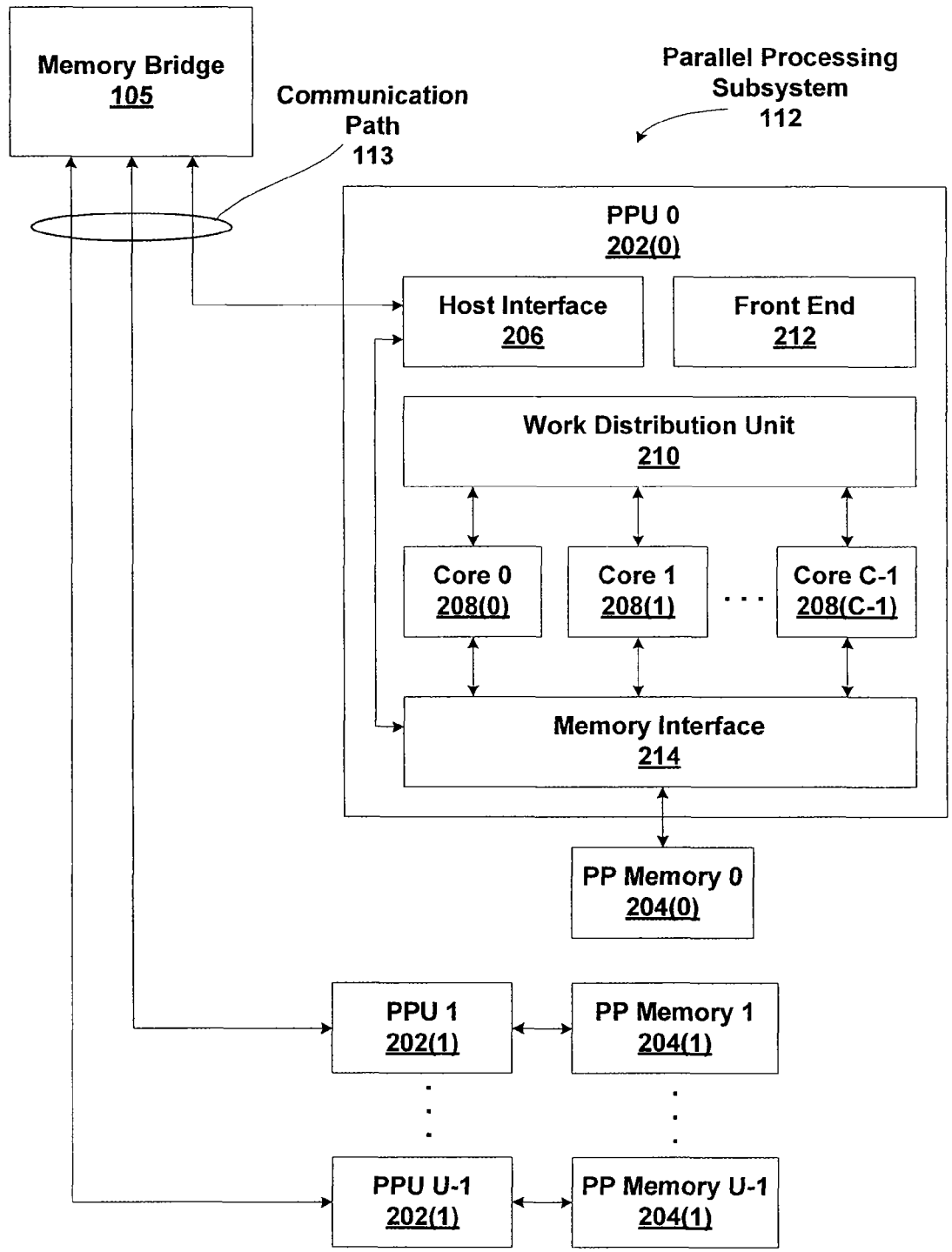
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where 1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C 1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
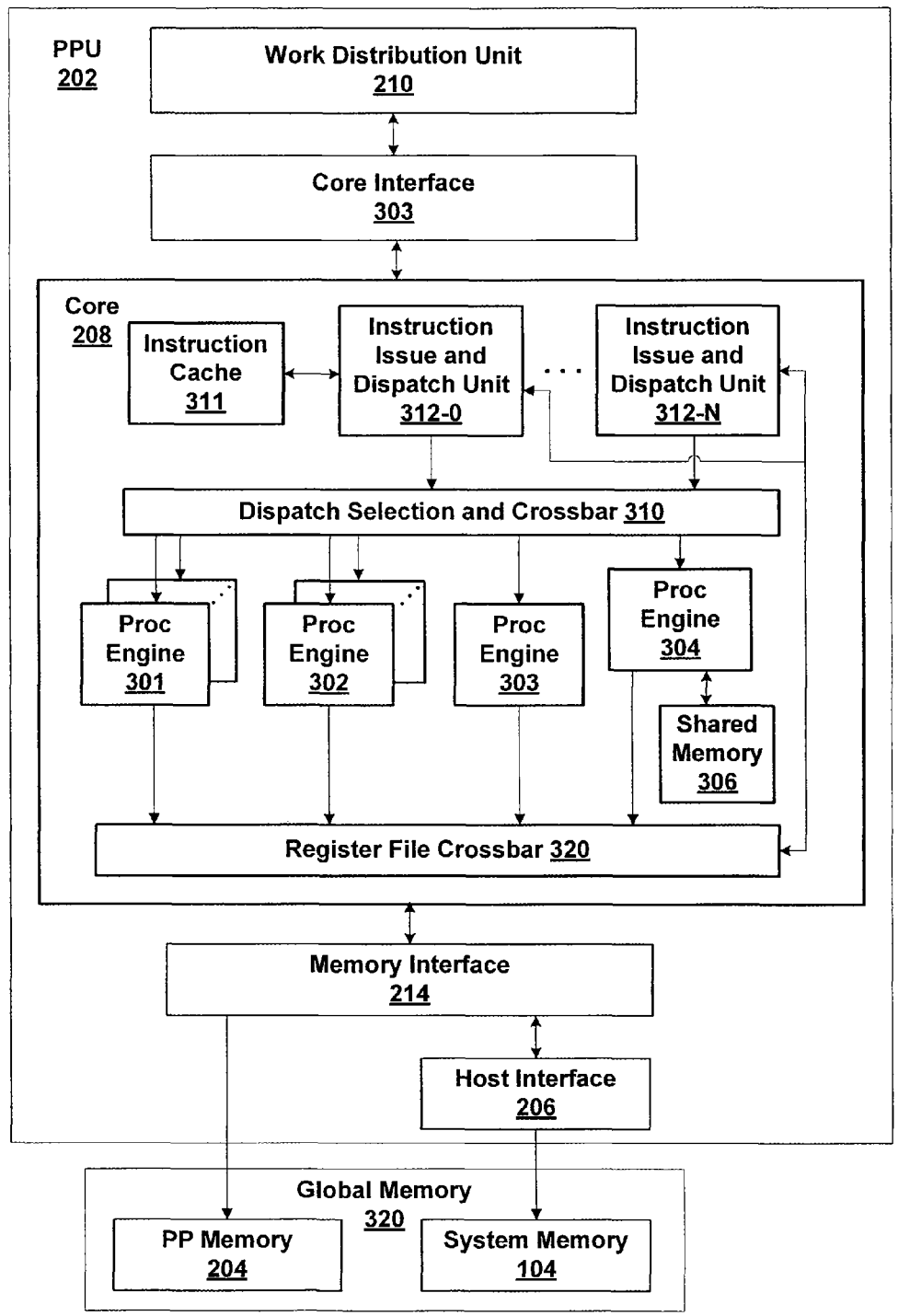
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, SIMD instruction issue techniques are used to support parallel execution of a large number of threads without providing multiple independent instruction units.

In one embodiment, each core 208 includes an array of P (e.g., 8, 16, etc.) parallel processing engines, processing engines 301, processing engines 302, processing engine 303, and processing engine 304, that are configured to receive SIMD instructions from instruction issue and dispatch units 312 via dispatch selection and crossbar 310. Multiple instruction issue and dispatch units 312, shown as 312-0 through 312-N, are included in core 208.

The processing engines may be configured to perform different operations and therefore may execute different instructions. For example, processing engine 301 may be configured to perform floating point arithmetic operations (e.g., addition and multiplication), processing engine 302 may be configured to perform fixed point arithmetic operations, processing engine 303 may be configured to perform texture mapping operations, and processing engine 304 may be configured to perform load and store operations by reading and writing entries in a shared memory 306. Dispatch selection and crossbar 310 selects instructions for parallel execution and routes each instruction to the processing engine, e.g., 301, 302, 303, or 304 that is specified by the instruction and/or configured to execute the instruction.

Each instruction issue and dispatch unit 312 may be configured to output one instruction per clock cycle. The number of instruction issue and dispatch units 312 may vary for each embodiment. However, in order to provide enough instructions in a clock cycle for processing engines 301, 302, 303, and 304, the number of instruction issue and dispatch units 312 can match the number of instructions that can be accepted by processing engines 301, 302, 303, and 304 each clock cycle. Note, a single instruction is provided for parallel execution by one or more processing engines 301 in a clock cycle. Likewise, a different single instruction is provided for parallel execution by one or more processing engines 302 in a clock cycle and two other instructions are provided for parallel execution by processing engine 303 and 304. One or more of processing engines 301, 302, 303, and 304 may be configured to accept a new instruction less frequently than every clock cycle. In an embodiment of the present invention in which processing engine 301 accepts an instruction every clock cycle and processing engines 302 303, and 304 accept an instruction every third clock cycle only two instruction issue and dispatch units 312 are needed to provide instructions to dispatch selection and crossbar 310. Alternatively, a single instruction issue and dispatch unit 312 (rather than N+1 instruction issue and dispatch units 312) may be configured to fetch N+1 instructions in one clock cycle for processing engines 301, 302, 303, and 304.

The functional units in each processing engine 301, 302, 303, and 304 may be pipelined, allowing a new instruction to be issued before a previous instruction has finished, as is known in the art. In one embodiment, the functional units support a variety of operations including comparison operations, Boolean operations (AND, OR, XOR), bit-shifting, and computation of various algebraic functions (e.g., planar interpolation, trigonometric, exponential, and logarithmic functions, etc.). Some operations may be performed by different processing engines, allowing those program instructions to be executed by two or more different processing engines. Program instructions that can only be executed by one type of processing engine, e.g., processing engine 301, processing engine 302, processing engine 303, or processing engine 304 must be executed by that type of processing engine. An advantage of restricting the operations performed by a particular processing engine is that the performance of the processing engine may be optimized for that operation. Therefore, heterogeneous processing engines may provide in a greater throughput and/or reduced circuitry, which may reduce the overall die area and power consumption compared with homogeneous processing engines. Furthermore, the architecture is easily scaled to increase or decrease processing throughput by adding or omitting additional processing engines and increasing or decreasing the capacity of dispatch selection and crossbar 310. This flexibility is possible since any processing engine may execute instructions (of the corresponding type) for any thread.

Each processing engine 301, 302, 303, and 304 stores its local input data, intermediate results, and the like, in local register files (LRF) within instruction issue and dispatch units 312. Register file crossbar 320 allows each processing engine 301, 302, 303, and 304 to access any entry in the local register files within instruction issue and dispatch units 312. Each processing engine 301, 302, 303, and 304 also has access (through processing engine 304) to an on-chip shared memory 306 in core 208. Shared memory 306 may be as large as desired, and in some embodiments, any processing engine 301, 302, 303, and 304 can read to or write from any location in shared memory 306 with equally low latency (e.g., comparable to accessing local register file 304).

In addition to shared memory 306, some embodiments also provide an on-chip instruction cache 311, which may be implemented, e.g., as a conventional RAM or cache. In some embodiments of the present invention, a parameter cache is also included in core 208 that can be used, e.g., to hold state parameters and/or other data (e.g., various constants) that may be needed by multiple threads. Processing engines 301, 302, 303, and 304 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 301, 302, 303, and 304 can be coupled to memory interface 214 via an interconnect (not explicitly shown) that allows any processing engine 301, 302, 303, and 304 to access global memory 320.

Dispatch selection and crossbar 310 is configured such that, for any given processing cycle, instructions (INSTR) may be issued to all processing engines 301, 302, 303, and 304. Thus, at the level of a single clock cycle, core 208 implements a P-way SIMD microarchitecture for each type of processing engine, where P is the number of processing engines of a particular type. As previously explained, instruction issue and dispatch units 312 are configured to output program instructions for processing engines 301, 302, 303, and 304 to dispatch selection and crossbar 310 at a rate that those engines can consume the program instructions. Since each processing engine 301, 302, 303, and 304 is pipelined, supporting up to G threads concurrently, core 208 in this embodiment can have up to P*G threads executing concurrently for each type of processing engine. For instance, if P=16 and G=24, then core 208 supports up to 384 concurrent threads for one type of processing engine.

Because dispatch selection and crossbar 310 issues an instruction to a processing engines of a particular type in parallel, core 208 is advantageously used to process threads in "SIMD thread groups." As used herein, a "SIMD thread group" refers to a group of up to P threads of execution of the same program on different input data, with one thread of the group being assigned to each processing engine of the particular type. A SIMD thread group may include fewer than P threads, in which case some of the processing engines of the particular type will be idle during cycles when that SIMD thread group is being processed. A SIMD thread group may also include more than P threads, in which case processing will take place over consecutive clock cycles. Since each processing engine 301, 302, 303, and 304 can support up to G threads concurrently, it follows that up to G SIMD thread groups can be executing in core 208 at any given time.

On each clock cycle, an instruction that is issued to up to P threads making up a selected one of the SIMD thread groups. To indicate which thread is currently active, an "active mask" for the associated thread may be included with the instruction. Processing engines 301, 302, 303, and 304 use the active mask as a context identifier, e.g., to determine which portion of its assigned subunit in local register files 304 should be used when executing the instruction. Thus, in a given cycle, the same type of processing engines 301, 302, 303, or 304 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into a parameter memory. Core interface 303 also initializes each new thread or SIMD thread group in instruction issue and dispatch units 312, then signals instruction issue and dispatch units 312 to begin executing the threads by issuing instructions. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Multithreaded Instruction Processing

Figure 4A:
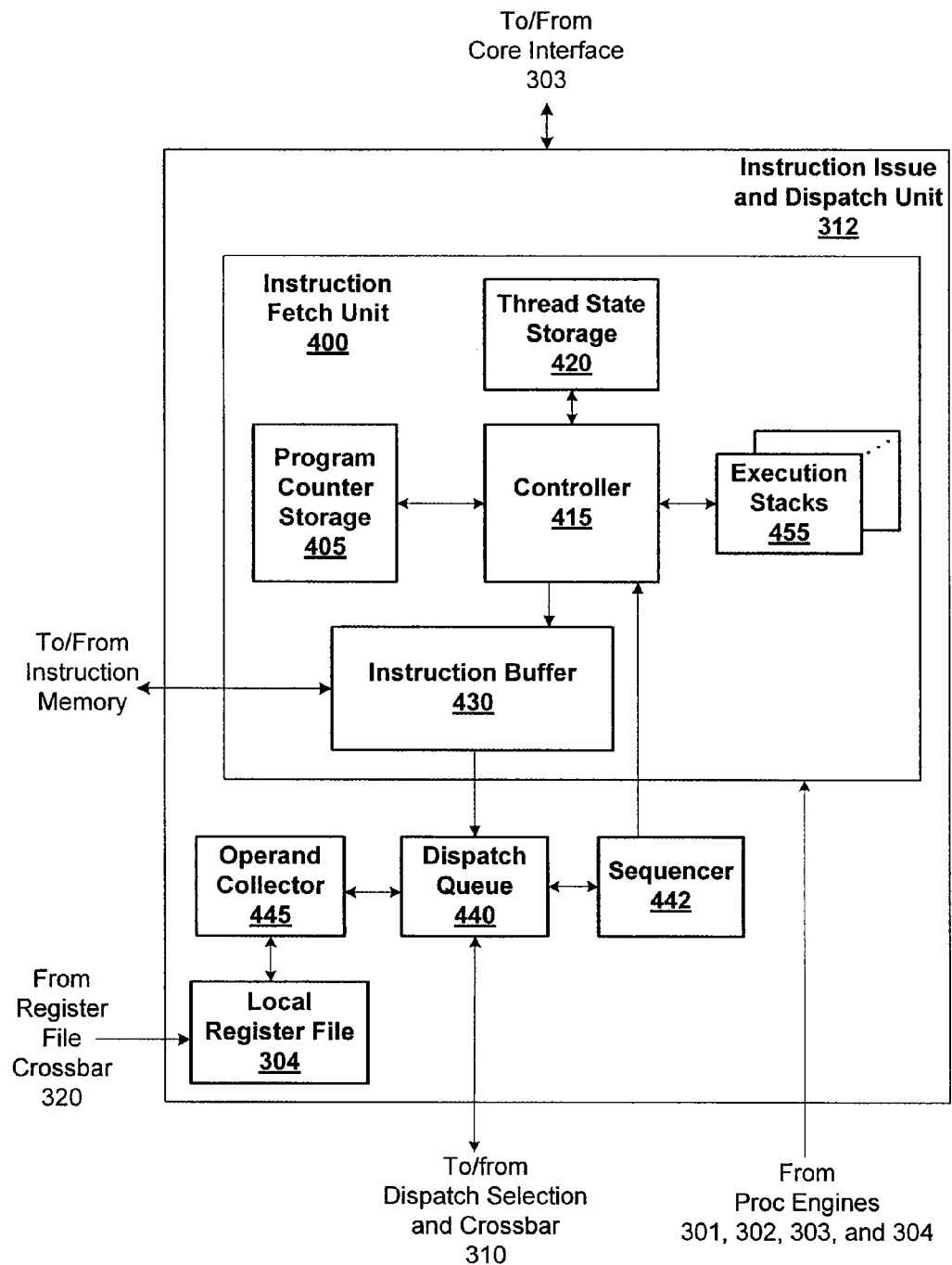
FIG. 4A is a block diagram of an instruction issue and dispatch unit for the parallel processing unit of FIG. 3 in accordance with one or more aspects of the present invention.

FIG. 4A is a block diagram of one of the instruction issue and dispatch units 312 for the parallel processing unit 202 of FIG. 3, in accordance with one or more aspects of the present invention. Instruction issue and dispatch unit 312 includes an instruction fetch unit 400, operand collector 445, local register file 304, and dispatch queue 440, and sequencer 442. Instruction fetch unit 400 receives data to be processed and a program identifier corresponding to a program that should be used to process the data. A program counter storage 405 stores the active program counter, indicating the next program instruction (INSTR) that should be executed for each SIMD thread group. When G=24, program counter storage 405 stores 24 active program counters. Similarly, thread state storage 420 stores an active mask for each SIMD thread group, where each bit of the active mask corresponds to an integer number of the P processing engines of each type 301, 302, 303, and 304. Therefore, the number of bits in the active mask for each processing engine type is the number of threads in a SIMD thread group.

Execution stacks 455 include a stack for each SIMD thread group that is used during control instruction processing to push and pop state information. In some embodiments of the present invention, execution stacks 455 may spill entries to global memory 320 for any execution stacks 455 that overflow and restore spilled entries when space is available in execution stacks 455. Controller 415 pushes and pops entries from execution stacks 455 as control instructions, such as branch, return, call, and break instructions are executed.

Controller 415 provides an active program counter and active mask for a SIMD thread group to instruction buffer 430. Instruction buffer 430 obtains the instruction corresponding to the active program counter and outputs the instruction and active mask to dispatch selection and crossbar 310. Instruction buffer 430 reads the instructions from instruction memory (global memory 320 or other memory) as needed, using caching techniques known to those skilled in the art. Instruction buffer 430 outputs the instructions to dispatch queue 440. Dispatch queue 440 interfaces with operand collector 440 to gather the operands that are specified for each instruction. Once all of the operands are gathered for an instruction, the instruction is eligible for dispatch by dispatch selection and crossbar 310.

In one embodiment, local register file 304 is physically or logically divided into subunits, each having some number of entries (where each entry might store, e.g., a 32-bit word). One subunit is assigned to each processing engine 301, 302, 303, and 304, and corresponding entries in different subunits can be populated with data for different threads executing the same program to facilitate SIMD execution. In some embodiments, each processing engine 301, 302, 303, and 304 can only access LRF entries in the subunit assigned to it and register file crossbar 320 may be omitted. The total number of entries in local register files 304 is advantageously large enough to support multiple concurrent threads per processing engine 301, 302, 303, and 304.

Dispatch queue 440 presents the eligible instructions to dispatch selection and crossbar 310. When an instruction is selected for dispatch by dispatch selection and crossbar 310, sequencer 442 outputs any target program counter (address) specified by the instruction to controller 415. Some program instructions, such as control instructions that do not perform branching based on a register value or other data are intercepted by sequencer 442 and processed within instruction issue and dispatch unit 312. Those control instructions are not output to dispatch selection and crossbar 310. Other eligible instructions from dispatch queues 440 are presented to dispatch selection and crossbar 310. Dispatch selection and crossbar 310 selects instructions for execution from the eligible instructions presented by instruction queues 440, as described in conjunction with FIGS. 4B, 5A, and 5B.

Note that sequencer 442 presents a variety of instructions for execution some of which are multi issue (can be executed by more than one type of processing engine) and others that can only be executed by one type of processing engines 301, 302, 303, and 304. Dispatch selection and crossbar 310 selects instructions for each type of processing engine and stores each selected instruction to a set of slots that is coupled to each dispatch queue 440. Dispatch selection and crossbar 310 dispatches the selected instructions from the slots through a crossbar to processing engines 301, 302, 303, and 304. In some embodiments of the present invention, each dispatch queue 440 narrows the number of eligible instructions that dispatch selection and crossbar 310 selects from. For example, dispatch queue 440 may be configured to present a small number of eligible instructions, multi issue instructions and one instruction for each type of processing engine that can only by executed by that type of processing engine.

Figure 4B:
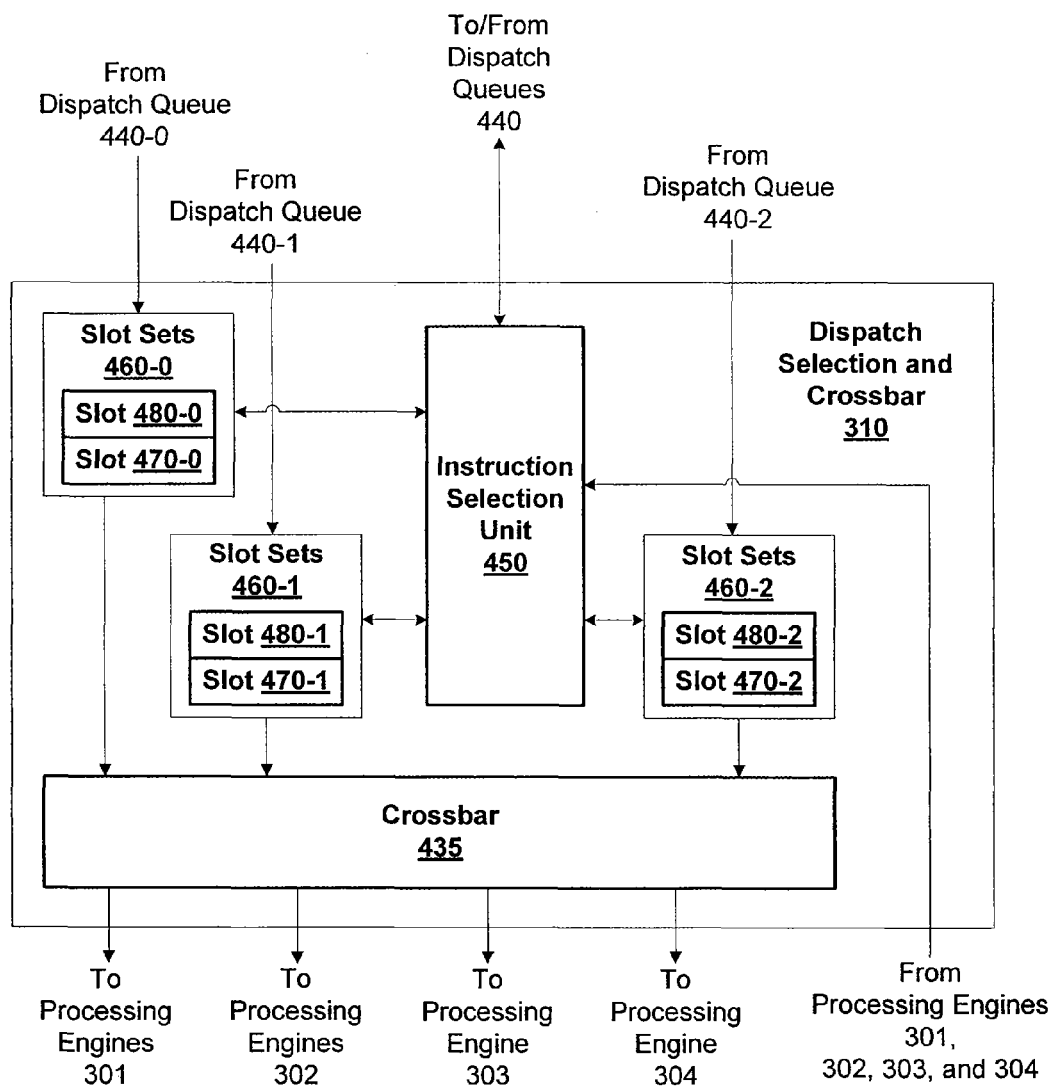
FIG. 4B is a block diagram of the dispatch selection and crossbar for the parallel processing unit of FIG. 4A in accordance with one or more aspects of the present invention.

FIG. 4B is a block diagram of dispatch selection and crossbar 310 for the parallel processing unit 202 of FIG. 3, in accordance with one or more aspects of the present invention. Dispatch selection and crossbar 310 includes a set of slots 460 for each dispatch queue 440, shown as slot sets 460-0 through 460-N, corresponding with instruction issue and dispatch unit 312-0 through 312-N. Dispatch selection and crossbar 310 also includes a crossbar 435 that is configured to route the instructions from first slots 470-0 through 470-N for output to processing engines 301, 302, 303, and 304. As previously explained, all processing engines of a particular type received the same instruction. In the embodiment shown in FIG. 4B, some of the processing units do not accept a new instruction for processing each clock cycle, therefore the number dispatch queues 440 is not equal to the number of different processing unit types.

In some embodiments of the present invention, a first type of program instructions can only be executed by processing engines 301. The first type of program instructions may include floating point arithmetic operations (excluding the multiply operation since it is included in the second type). A second type of program instructions can be executed by processing engines 301 and processing engines 302 and are referred to as "multi issue" instructions, meaning that any processing engine configured to receive instructions from dispatch selection and crossbar 310 is capable of executing the instruction. The second type of program instructions may include move and a floating point multiply operations. A third type of program instructions can only be executed by processing engines 302. The third type of program instructions may include fixed integer arithmetic operations such as addition, subtraction, and reciprocal. In some embodiments of the present invention, processing engine 303 may be configured to process program instructions of a fourth type, such as texture mapping program instructions, e.g., level of detail, texture address, and other computations for point sample, bilinear, trilinear, anisotropic texture mapping, and the like. Processing engine 304 may be configured to process load and store program instructions to read and write entries in shared memory 306.

An advantage of configuring more than one of the heterogeneous processing engines to process some instructions is that those program instructions, i.e., the second type or other non-conflicting instructions, can be selected and dispatched for execution by the type of heterogeneous processing engine with a lower workload to dynamically balance the workload. Balancing the workload permits better utilization of each processing engine to improve overall instruction execution throughput. When commonly used instructions are multi issue instructions dispatch selection and crossbar 310 is better able to balance the processing workload more evenly than when only a small portion of the instructions in a program are multi issue.

Dispatch selection and crossbar 310 outputs program instructions stored in one or more first slots 470 to one or more of processing engines 301, 302, 303, and 304 each clock cycle. When at least one program instruction is present in a first queue of dispatch queues 440, dispatch selection and crossbar 310 selects and loads the highest priority program instruction for dispatch queue 440-0 into first slot 470-0.

The highest priority program instruction is the instruction that has been present in the dispatch queue 440 for the greatest number of clock cycles. In some embodiments of the present invention, the greatest number of clock cycles is measured once the program instruction is eligible for dispatch. In other embodiments of the present invention, the greatest number of clock cycles is measured from the time the program instruction is issued to dispatch queue 440. Alternatively, the highest priority instruction may be an instruction in the instruction issue and dispatch unit 312 that has the least number of eligible instructions or that has the most instructions in dispatches queue 440. The highest priority program instruction may be a multi issue instruction or an instruction that can only be executed by one type of processing engine, e.g., the first, third, fourth, or fifth type of program instruction.

When at least one non-conflicting program instruction is present in the first queue, dispatch queue 440-0, dispatch selection and crossbar 310 selects and loads the highest priority non-conflicting program instruction for the first queue into second slot 480-0. A multi issue program instruction is a non-conflicting program instruction since more than one processing engine can execute the multi issue instruction. Therefore, the multi issue program instruction can be output for execution in parallel with the program instruction in first slot 470-1. However, it is possible to select a non-conflicting program instruction for second slot 480 that is not a multi issue instruction. Importantly, selecting the instructions for each slot sets 460 is performed independently, so the selection and loading of the slot sets 460 may be performed in parallel for dispatch queues 440.

When at least one program instruction is present in a second queue, dispatch queue 440-1, dispatch selection and crossbar 310 selects and loads the highest priority program instruction for the second queue into first slot 470-1. Finally, when at least one multi issue program instruction is present in the second queue, dispatch selection and crossbar 310 selects and loads the highest priority non-conflicting program instruction for the second queue into second slot 480-1. In other embodiments of the present invention, program instructions are selected based on a different set of criteria, such as thread priority, to load first slots 470 and second slots 480. Instruction selection unit 450 also loads the first and second slots of slot sets 460-2 and 460-3 when eligible instructions are available in dispatch queue 440-2 and 440-3, respectively.

Instruction selection unit 450 determines if an execution conflict exists between the program instructions stored in first slots 470, i.e., the highest priority program instruction from the first, second, third, and fourth dispatch queues. A conflict exists between the two or more program instructions when some of the instructions can only be executed by the same type of processing engine since only one program instruction can be dispatched in a single clock cycle for execution by each processing engine. Instruction selection unit 450 also determines if a program instruction is not stored in any first slots 470 and transfers a non-conflicting program instruction from a second slot 480 to populate the empty slot.

In some embodiments of the present invention, a compiler specifies a target, the type of heterogeneous processing engine, e.g., processing engine 301, 302, 303, or 304, that one or more program instructions are assigned to for execution.

The following sequence includes move (MOV) instructions that are specified for execution by a particular target or are specified for dynamic dispatching by dispatch selection and crossbar 310 at execution time.

MOV.A

MOV.B

MOV.DYNAMIC

Instruction selection unit 450 may be configured to use the specified targets when determining whether or not an execution conflict exists. An advantage of postponing the determination until the program is executing is that instruction selection unit 450 may perform better load balancing by accounting for varying execution conditions as they occur, such as memory access latencies, branch execution, and the like.

Figure 5A:
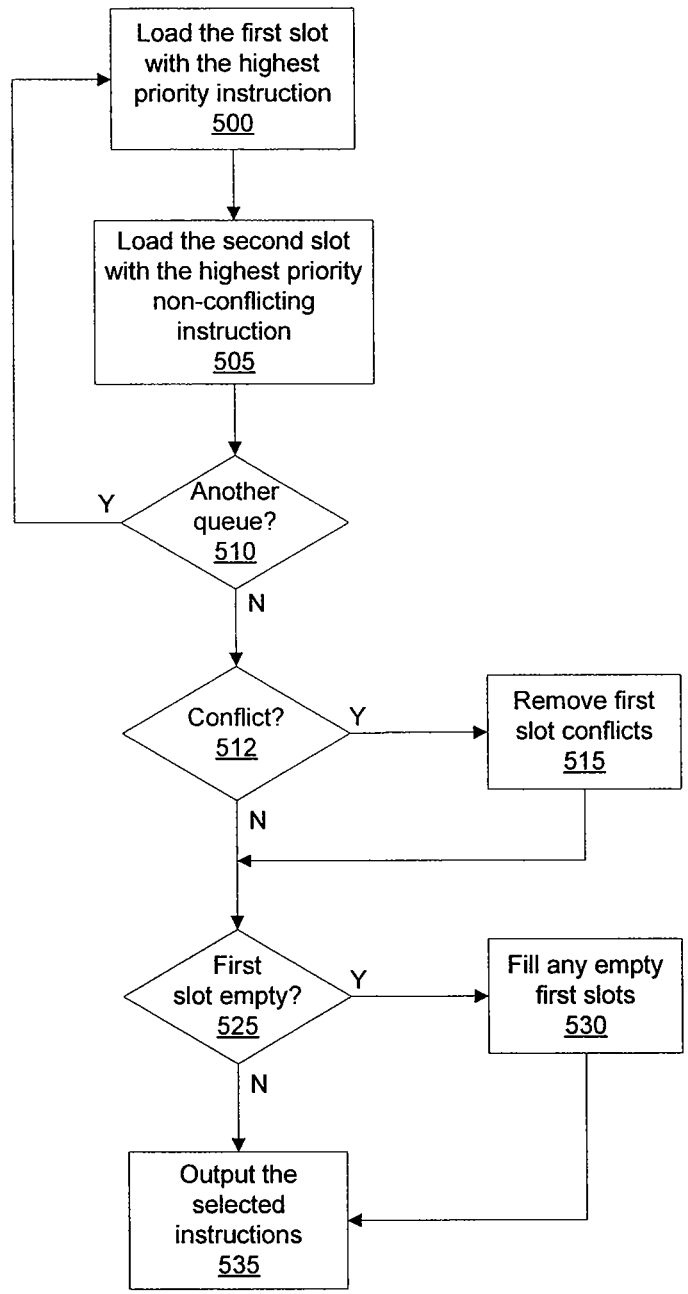
FIG. 5A is a flow diagram of method steps for dispatching the instructions in accordance with one or more aspects of the present invention.
Figure 5B:
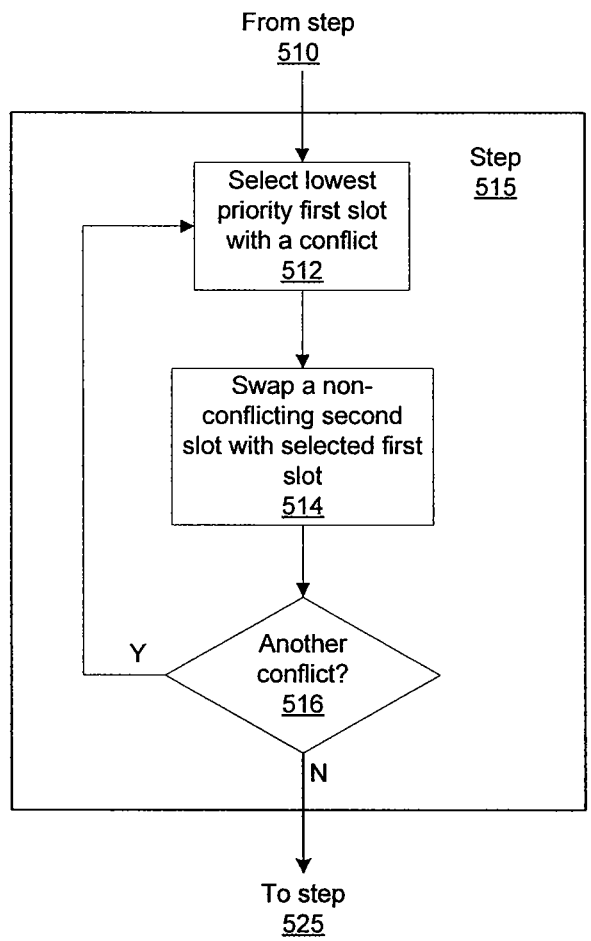
FIG. 5B is a flow diagram of one of the steps of FIG. 5A in accordance with one or more aspects of the present invention.

When an execution conflict does exist, instruction selection unit 450 swaps the conflicting program instruction that is stored in a first slot 470 with a non-conflicting program instruction that is stored in a second slot 480, as described in conjunction with FIGS. 5A and 5B.

FIG. 5A is a flow diagram of method steps for dispatching the instructions for execution by the heterogeneous processing engines 301, 302, 303, or 304, in accordance with one or more aspects of the present invention. FIG. 5A illustrates instruction dispatching when four types of heterogeneous processing engines are used, e.g., processing engines 301, 302, 303, and 304. In other embodiments of the present invention, fewer or additional heterogeneous processing engines may be used, and those skilled in the art may extend the described method to include those additional heterogeneous processing engines in the dispatching process.

In step 500 instruction selection unit 450 loads a first slot 470 with the highest priority program instruction from a first dispatch queue 440. Note that the highest priority program instructions from any dispatch queue 440 may be of the first type, second type, or third type. In step 505 instruction selection unit 450 loads second slot 480 with the highest priority non-conflicting program instruction from the first dispatch queue 440. When a non-conflicting instruction is not available in a dispatch queue 440, the corresponding second slot 480 is left empty. Similarly, when a dispatch queue 440 is empty, both slots in the corresponding slot set 460 are left empty.

In step 510 instruction selection unit 450 determines if there is another dispatch queue 440 and slot set 460 to be filled with instructions, and if so, steps 500 and 505 are repeated. Otherwise, all of the slots 460 that can be filled with eligible instructions have been filled, and in step 512 instruction selection unit 450 determines if any instruction conflicts exist between the first slots 470. If all of the instructions stored in first slots 470 can be output by dispatch selection and crossbar 310 in parallel, i.e., in a single clock cycle, then no instruction conflict exists. In some cases, it may not be necessary to output all of the instructions in a single clock cycle since some processing units may not be able to accept an instruction during that clock cycle. In those cases, no instruction conflict exists if all of the instructions that can be accepted can be output in parallel.

If, in step 512 instruction selection unit 450 determines that an instruction conflict exist between the first slots 470, then in step 515 instruction selection unit 530 removes the first slot 470 conflicts, as described in conjunction with FIG. 5B, and then proceeds to step 525. In step 525 instruction selection unit 450 determines if at least one of the first slots 470 is empty, and, if not, instruction selection unit 450 proceeds directly to step 535. Otherwise, in step 530 instruction selection unit 450 fills the empty first slots 470 with non-conflicting instructions from second slots 480. Instruction selection unit 450 may be configured to select the highest priority non-conflicting instructions from second slots 480.

When an execution conflict does not exist, in step 535 instruction selection unit 530 outputs the selected instructions that are in first slots 470 to the processing engines 301, 302, 303, and 304 that are able to accept an instruction. Instruction selection unit 530 provides information identifying the type of processing engine that should be used to execute the selected instructions in order for dispatch crossbar to route each instruction to a processing engine of a corresponding type. Note that when instructions remain in slot sets 460, those instructions are retained and not overwritten when steps 500 and 505 are completed.

FIG. 5B is a flow diagram of step 515 of FIG. 5A, in accordance with one or more aspects of the present invention. In step 512 instruction selection unit 450 selects a conflicting instruction that has the lowest priority and occupies a first slot 460. In step 514 instruction selection unit 450 swaps a non-conflicting instruction that occupies a second slot 480 with the selected instruction to remove the conflict. In step 516 instruction selection unit 450 determines if another conflict exists, and, if so, steps 512 and 514 are repeated. Otherwise, instruction selection unit 450 proceeds to step 525.

Swapping a non-conflicting instruction from one of second slots 480 into a first slot 460 ensures that the program instructions stored in first slots 460 can be dispatched simultaneously since the execution conflict is removed. In some embodiments of the present invention, a round robin scheme is used to override the preference given to the highest priority slot so that some program instructions from the dispatch queue 440 that does not include the highest priority program instructions are dispatched.

An advantage of the disclosed system and method is that instruction execution throughput may be improved by eliminating any execution conflicts during instruction dispatch to the different heterogeneous processing engines. A compiler can specify a target processing engine for each multi issue instruction or the compiler can specify that one or more of the multi issue instructions should be dynamically dispatched to balance the processing workload between the different processing engines to improve overall instruction execution throughput.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for dispatching program instructions for execution in a SIMD (single-instruction multiple-data) architecture with heterogeneous processing engines of different types, the method comprising:
    loading first dispatch slots with first program instructions that are highest priority program instructions, wherein each of the first program instructions is executable by only a specific type of the heterogeneous processing engines;
    loading second dispatch slots with second program instructions that can be executed by any type of the heterogeneous processing engines, wherein each of the second dispatch slots corresponds to a different first dispatch slot; and
    for each of the first program instructions that are loaded into first dispatch slots:
        determining that an execution conflict exists between the first instruction and other first program instructions, and
        for each of the other first program instructions:
            loading the first program instruction into the corresponding second dispatch slot and loading the second program instruction in the corresponding second slot into the corresponding first dispatch slot.

2. The method of claim 1, further comprising dispatching the program instructions in the first dispatch slots for execution by the heterogeneous processing engines.

3. The method of claim 1, wherein a target heterogeneous processing engine is specified by the first program instructions and the second program instructions.

4. The method of claim 3, wherein the target heterogeneous processing engine is determined by a compiler.

5. The method of claim 1, further comprising the step of second program instructions from the second dispatch slots into empty corresponding first dispatch slots when the corresponding first dispatch slots are empty.

6. The method of claim 1, wherein the execution conflicts are removed based on priority levels of the conflicting instructions.

7. The method of claim 1, further comprising the step of selecting the program instructions for input into the first or second dispatch slots based on the type of the heterogeneous processing engines that can execute the program instructions.

8. The method of claim 1, wherein the heterogeneous processing engines are configured to execute program instructions in parallel for multiple threads in a SIMD thread group.

9. A non-transitory computer readable storage medium storing instructions for causing a SIMD (single-instruction multiple-data) architecture processor that includes heterogeneous processing engines of different types to dispatch instructions for execution by performing the steps of:
    loading first dispatch slots with first program instructions that are highest priority program instructions, wherein each of the first program instructions is executable by only a specific type of the heterogeneous processing engines;
    loading second dispatch slots with second program instructions that can be executed by any type of the heterogeneous processing engines, wherein each of the second dispatch slots corresponds to a different first dispatch slot; and
    for each of the first program instructions that are loaded into first dispatch slots:
        determining that an execution conflict exists between the first instruction and other first program instructions, and for each of the other first program instructions:
  loading the first program instruction into the corresponding second dispatch slot and loading the second program instruction in the corresponding second slot into the corresponding first dispatch slot.

10. A system for dispatching instructions for execution in a SIMD (single-instruction multiple-data) architecture that includes heterogeneous processing engines of different types, the system comprising:

a plurality of dispatch queues each coupled to a different corresponding first dispatch slot and second dispatch slot and configured to store first program instructions and second program instructions, wherein each of the first program instructions is executable by only a specific type of the heterogeneous processing engines and each of the second program instructions is executable by any type of the heterogeneous processing engines; and an instruction selection unit coupled to each of the dispatch queues and configured to:

select, from each dispatch queue, a highest priority first program instruction and load the first program instruction into the corresponding first dispatch slot;

select, from each dispatch queue, a highest priority second program instruction and load the second program instruction into the corresponding second dispatch slot; and for each of the first program instructions that are loaded into first dispatch slots:
    determining that an execution conflict exists between the first instruction and other first program instructions, and
    for each of the other first program instructions:
      loading the first program instruction into the corresponding second dispatch slot and loading the second program instruction in the corresponding second slot into the corresponding first dispatch slot.

11. The system of claim 10, wherein the instruction selection unit is further configured to dispatch the program instructions in the first dispatch slots for execution by the heterogeneous processing engines.

12. The system of claim 10, wherein the execution conflicts are removed based on priority levels of the conflicting program instructions.

13. The system of claim 10, further comprising a dispatch crossbar that is configured to route each program instruction dispatched from the instruction selection unit to the heterogeneous processing engines.

14. The system of claim 10, wherein each one of the heterogeneous processing engines is configured to execute a program instruction in parallel for multiple threads in a SIMD thread group.

15. The system of claim 10, wherein the instruction dispatch unit is further configured to move the second program instructions from the second dispatch slots into empty corresponding first dispatch slots when the corresponding first dispatch slots are empty.

16. The system of claim 10, wherein the program instructions are selected for input into the dispatch slots based on the type of the heterogeneous processing engines that can execute the program instructions.

17. The system of claim 10, wherein a target processing engine is specified by the first program instructions and the second program instructions.

* * * * *